United States Patent
Iwai et al.

(10) Patent No.: US 8,079,742 B2
(45) Date of Patent: Dec. 20, 2011

(54) ILLUMINATION STRUCTURE

(75) Inventors: Shiro Iwai, Haga-machi (JP); Koji Imaizumi, Utsunomiya (JP); Aika Saito, Utsunomiya (JP)

(73) Assignee: Honda Access Corp., Niiza-shi, Saitama (JP)

( * ) Notice: Subject to any disclaimer, the term of this patent is extended or adjusted under 35 U.S.C. 154(b) by 193 days.

(21) Appl. No.: 12/693,684

(22) Filed: Jan. 26, 2010

(65) Prior Publication Data

US 2010/0214796 A1 Aug. 26, 2010

(30) Foreign Application Priority Data

Feb. 23, 2009 (JP) ................................ 2009-038751

(51) Int. Cl.
  *B60Q 1/24* (2006.01)
(52) U.S. Cl. ...................................... 362/495; 362/501
(58) Field of Classification Search .................. 362/481, 362/495, 501
  See application file for complete search history.

(56) References Cited

U.S. PATENT DOCUMENTS

| 1,460,316 | A | * | 6/1923 | Dobschutz | 362/495 |
| 1,569,867 | A | * | 1/1926 | Lindsay | 362/495 |
| 2,081,899 | A | * | 6/1937 | Bridge | 362/495 |
| 2,631,390 | A | * | 3/1953 | Dorogoff | 40/518 |
| 4,972,173 | A | * | 11/1990 | Raciti | 340/472 |
| 6,000,822 | A | * | 12/1999 | Polizzi et al. | 362/488 |
| 6,160,475 | A | * | 12/2000 | Hornung et al. | 340/461 |
| 6,244,734 | B1 | | 6/2001 | Hulse | |
| 2010/0271837 | A1 | * | 10/2010 | Yamauchi et al. | 362/549 |

FOREIGN PATENT DOCUMENTS

EP 1792781 B1 10/2008

* cited by examiner

*Primary Examiner* — David V Bruce
(74) *Attorney, Agent, or Firm* — Westerman, Hattori, Daniels & Adrian, LLP

(57) ABSTRACT

An aspect of the invention provides an illumination structure that can illuminate both a neighborhood of an opening and a storage portion with a simple configuration. An illumination structure 1 includes an illumination device 4 provided in an opening 3 of a vehicle 2, and a person can get on and off the vehicle 2 through the opening 3. The illumination device 4 is fixed to a step garnish 5 provided in a lower end portion 3*a* of the opening 3. A translucent member 18 is provided in a bottom surface of a storage portion 9 formed in a door lining 10. When a door 6 is closed against the opening 3, the storage portion 9 is disposed on the step garnish 5, whereby the illumination structure 1 is retained while the illumination device 4, a first translucent member 18*a*, and a second translucent member 18*b* line up in the order from the bottom.

6 Claims, 2 Drawing Sheets

ILLUMINATION STRUCTURE

BACKGROUND OF THE INVENTION

1. Field of the Invention

The present invention relates to an illumination structure, particularly to an illumination structure that illuminates a neighborhood of a vehicle door.

2. Description of the Related Art

Conventionally, for example, U.S. Pat. No. 6,244,734 discloses an illumination device as this kind of illumination structure. The illumination device is provided in a lower surface of an opening formed in a vehicle side portion through which a person gets on and off the vehicle. The illumination device lights up when a door provided in the opening is opened, and the illumination device illuminates feet of the person who gets on and off the vehicle, so that the person can easily get on and off the vehicle particularly at night.

EP Patent No. 1792781 discloses an illumination device that is provided above a storage portion formed in an inner surface of the door. The illumination device illuminates the inside of the storage portion from above, so that a person can easily recognize goods stored in the storage portion.

However, unfortunately the illumination devices disclosed in U.S. Pat. No. 6,244,734 and EP Patent No. 1792781 can illuminate only one of the neighborhoods of the opening and the storage portion.

SUMMARY OF THE INVENTION

An object of the invention is to provide an illumination structure that can illuminate both the neighborhood of the opening and the storage portion with a simple configuration.

In accordance with an aspect of the invention, there is provided an illumination structure that illuminates a neighborhood of an opening of a vehicle, the vehicle including the opening through which a person can get on and off a vehicle and a door that freely opens and closes the opening and has a storage portion in an inner surface thereof, the illumination structure including an illumination device that is provided in a lower portion of the opening; and a translucent member that is provided in a bottom surface of the storage portion.

In the illumination structure according to the aspect of the invention, preferably the translucent member is provided in the bottom surface of the storage portion that is disposed above the illumination device when the door is closed.

In the illumination structure according to the aspect of the invention, preferably the bottom surface of the storage portion is formed by a double structure that includes an outer bottom and an inner bottom, the translucent member includes a first translucent member that is provided in the outer bottom and a second translucent member that is provided in the inner bottom, and the second translucent member provided in the inner bottom is higher than the first translucent member provided in the outer bottom in a mechanical strength.

In the illumination structure according to the aspect of the invention, preferably the translucent member is formed so as to be able to diffuse incident light into the storage portion.

In the illumination structure according to the aspect of the invention, the illumination device that illuminates the opening when a person gets on and off the vehicle is also used as the illumination for the storage portion, so that the number of components can be reduced compared with the conventional case in which the means for illuminating the storage portion is separately provided. Accordingly, both the neighborhood of the opening and the storage portion can be illuminated with a simple configuration.

In the illumination structure according to the aspect of the invention, the light outputted from the illumination device is efficiently guided into the storage portion with a small amount of electric powers, so that the inside of the storage portion can more securely be illuminated.

In the illumination structure according to the aspect of the invention, goods, etc. stored in the storage portion can stably be retained.

In the illumination structure according to the aspect of the invention, the incident light is outputted as the diffusive light, so that the wider range in the storage portion can be illuminated.

DETAILED DESCRIPTION OF THE INVENTION

An exemplary embodiment of the invention will be described in detail with reference to the drawings.

Figure 1:
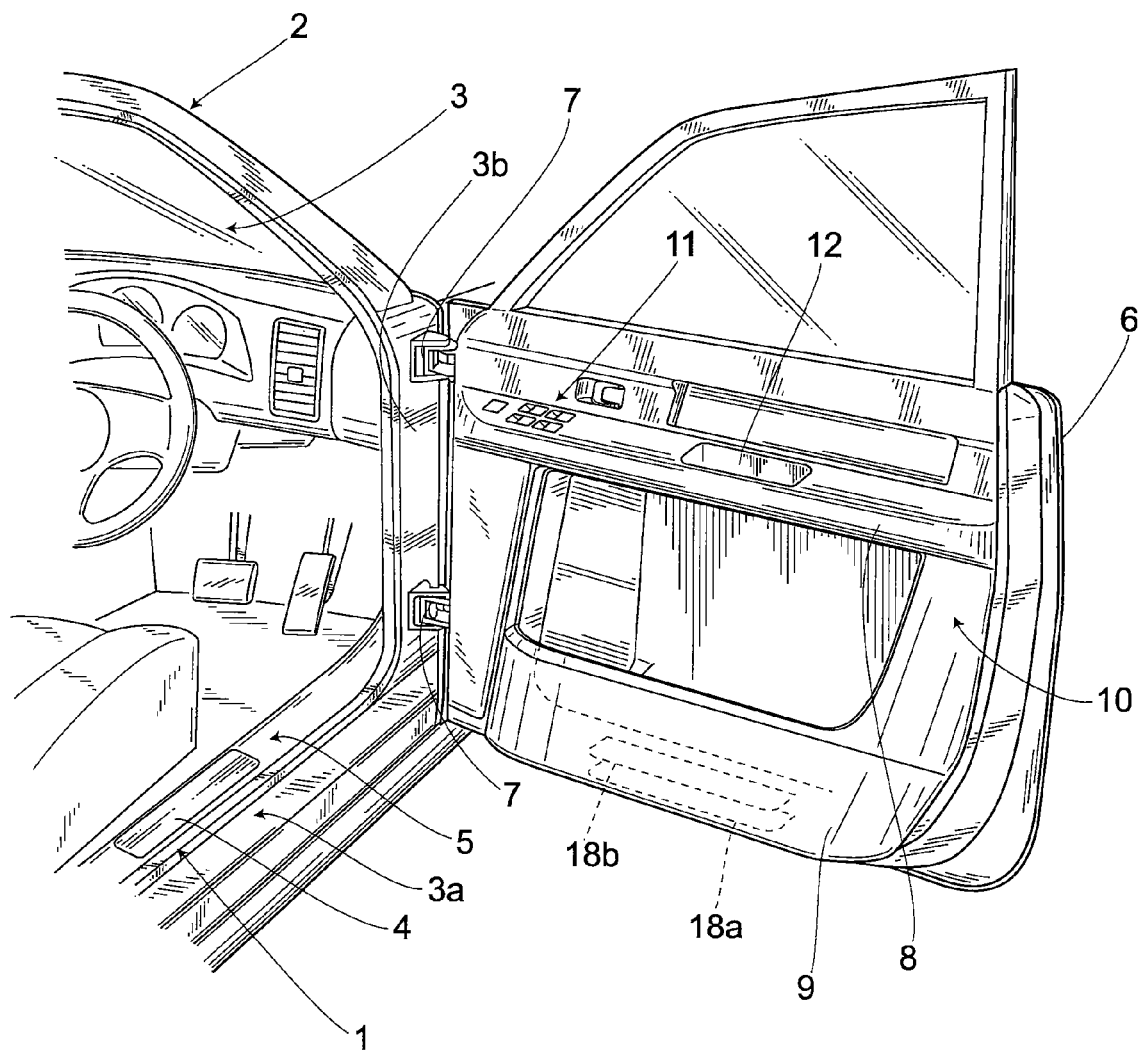
FIG. 1 is a perspective view illustrating an entire configuration of an illumination structure according to the invention.

An illumination structure 1 shown in FIG. 1 includes an illumination device 4 provided in an opening 3 of a vehicle 2, and a person can get on and off the vehicle 2 through the opening 3. The illumination device 4 is fixed to a step garnish 5 provided in a lower end portion 3a of the opening 3. Because the illumination structure 1 has the similar structures on the right and left of the vehicle 2, only the right side of the vehicle 2 is described below.

In the embodiment, the opening 3 is formed in a side face of the vehicle 2. A door 6 for closing the opening 3 is provided in the opening 3 so as to be freely openable and closable. The door 6 is journaled in hinges 7 and 7 provided in a forward edge 3b of the opening 3.

A door lining 10 is provided in an inner surface of the door 6, and a grip portion 8 and a storage portion 9 are formed in the door lining 10. A button group 11 and a grip handle 12 are formed in an upper surface of the grip portion 8. The button group 11 opens and closes a window, and the person grasps the grip handle 12 when opening and closing the door 6.

Figure 2:
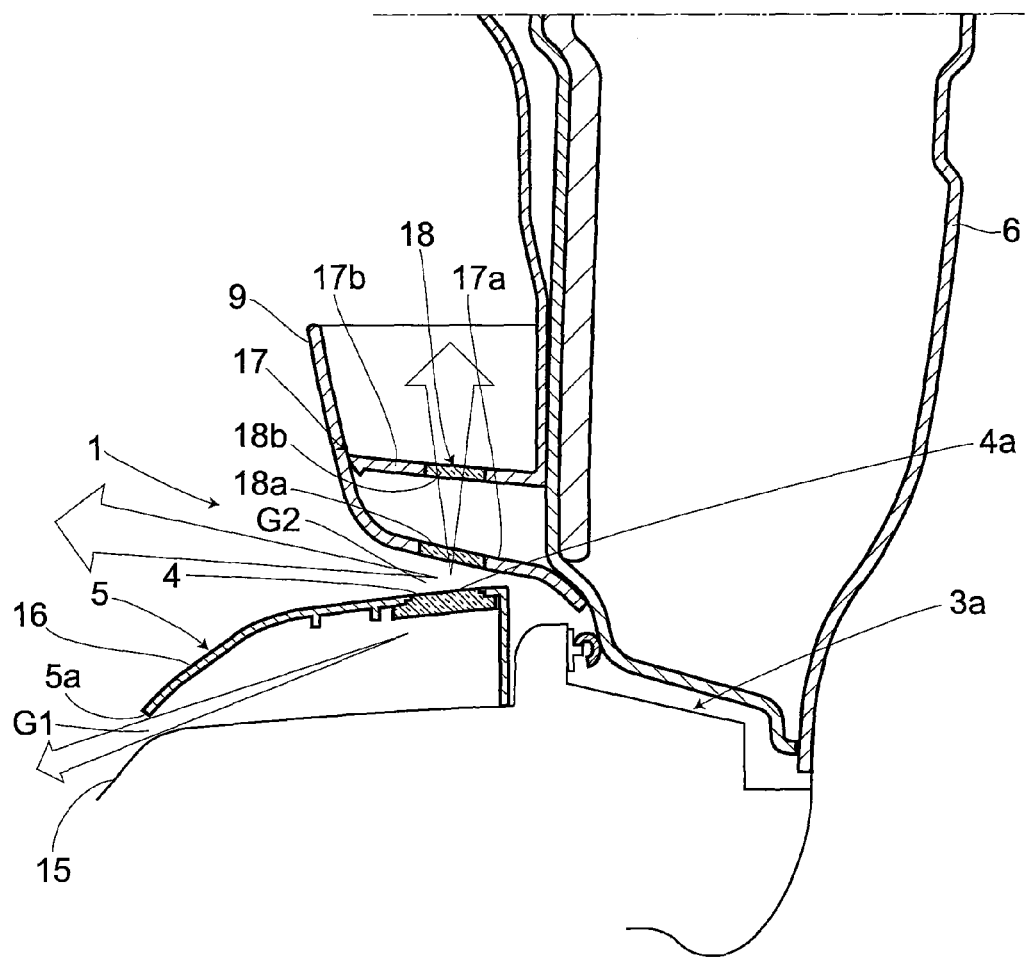
FIG. 2 is a longitudinal sectional view illustrating the structure of the illumination structure according to the invention.

As illustrated in FIG. 2, the step garnish 5 includes a base 16 that is formed into a shape along a frame 15 in a lower end portion of a vehicle body, and the illumination device 4 is retained in the base 16. A gap G1 is formed between an inner edge portion 5a of the step garnish 5 and the frame 15.

The illumination device 4 is formed into a thin plate shape, and includes a light source (not illustrated) that is configured by an LED (Light Emitting Diode) and a light guide plate that guides light emitted from the light source. In the embodiment, the illumination device 4 is configured so as to radiate the light to the outside from both surfaces, that is, from upper and lower surfaces in the embodiment, of the light guide device. For example, a transparent or semi-transparent member made of acrylic resin or the like can be used as the light guide plate. Although not illustrated, the light source is electrically connected to an on-board power supply, and the light source is configured so as to be lit on and turned off in conjunction with a small lamp switch of the vehicle 2 and an opening and closing switch which is turned on and off in conjunction with the opening and closing the door 6. That is, the light source is lit on by the opening and closing switch when the door 6 is opened, and the light source is turned off by the opening and closing switch when the door 6 is closed. The light source is also lit on by the small lamp switch when a small lamp is light on.

Additionally, in the illumination structure 1 according to the embodiment, a translucent member 18 is provided in a bottom surface of the storage portion 9 formed in the door lining 10. In the embodiment, the storage portion 9 has a double structure in which a bottom surface 17 includes a lower bottom 17a and an upper bottom 17b, and the storage portion 9 is configured so as to form the horizontal upper bottom 17b with respect to the lower bottom 17a that is of an outline of the storage portion 9.

The translucent member 18 is disposed in a position vertically above the illumination device 4 provided in a bottom surface of the opening 3 when the door 6 is closed against the opening 3. Various members may be used as the translucent member 18. For example, an acrylic transparent plate-like member can be used as the translucent member 18.

The translucent member 18 includes a first translucent member 18a provided in the lower bottom 17a and a second translucent member 18b provided in the upper bottom 17b. Preferably a member having a mechanical strength larger than that of the first translucent member 18a is selected as the second translucent member 18b. Preferably the second translucent member 18b has a lens structure that diffuses the transmitted light.

In the above-described configuration, when the door 6 is closed against the opening 3, the storage portion 9 is disposed on the step garnish 5, whereby the illumination structure 1 is retained while the illumination device 4, the first translucent member 18a, and the second translucent member 18b line up in the order from the bottom. A gap G2 is formed between the upper surface of the illumination device 4 and the lower bottom 17a of the storage portion 9.

In the thus configured illumination structure 1, when the small lamp of the vehicle 2 is lit on, the illumination device 4 is simultaneously lit on. That is, the light source emits the light toward the light guide plate. The light guide plate radiates the light toward the both surfaces, that is, upward and downward. The light radiated from one surface 4a of the light guide plate is transmitted from one of the surfaces to the other surface of the first translucent member 18a disposed vertically above the illumination device 4, and the light is incident to one of the surfaces of the second translucent member 18b.

The light incident to one of the surfaces of the second translucent member 18b is transmitted through the second translucent member 18b, whereby the light is diffused and outputted as diffusive light from the other surface of the second translucent member 18b. The diffusive light is outputted upward from the bottom surface of the storage portion 9, so that the inside of the storage portion 9 can be illuminated.

Thus, in the illumination structure 1, the light of the illumination device 4 provided in the step garnish 5 can be guided to the storage portion 9. With this configuration, the illumination device 4 that illuminates the opening 3 when a person gets on and off the vehicle is also used as an illumination for the storage portion 9. Therefore, the number of components can be reduced compared with the conventional case in which the means for illuminating the storage portion 9 is separately provided. Accordingly, in the illumination structure 1, both the neighborhood of the opening 3 and the inside of the storage portion 9 can be illuminated with a simple configuration.

In the embodiment, with the door 6 being closed against the opening 3, the illumination structure 1 is retained while the illumination device 4, the gap G2, the first translucent member 18a, and the second translucent member 18b line up in the order from the bottom. Therefore, the light outputted from the illumination device 4 is efficiently guided into the storage portion 9 with a small amount of electric powers, so that the inside of the storage portion 9 can more securely be illuminated.

At this point, in the second translucent member 18b, the incident light is outputted as the diffusive light, so that the wider range in the storage portion 9 can be illuminated.

In the illumination structure 1, the gap G2 is formed between the upper surface of the illumination device 4 and the bottom surface of the storage portion 9, so that the light can also be supplied into the vehicle interior from the gap G2.

The gap G1 is formed between the inner edge portion 5a of the step garnish 5 and the frame 15, so that the light can also be supplied into the vehicle interior from the gap G1.

The second translucent member 18b is configured of the material having the mechanical strength larger than that of the first translucent member 18a, so that goods, etc. stored in the storage portion 9 can stably be retained.

The invention is not limited to the above-described configuration, but various modifications can be made without departing from the scope of the invention. For example, in the embodiment above, the bottom surface of the storage portion 9 has the double structure. The invention is not limited to the double structure, but the storage portion 9 may have a single structure, that is, the storage portion 9 may be formed only by the lower bottom 17a.

In the embodiment, the light source is configured by an LED. The invention is not limited to LED, but the light source may be formed by a thin-film type electroluminescence element or a semiconductor laser or the like.

What is claimed is:

1. An illumination structure that illuminates a neighborhood of an opening of a vehicle, the vehicle including the opening through which a person can get on and off the vehicle and a door that freely opens and closes the opening and has a storage portion in an inner surface of door, the illumination structure comprising:
an illumination device that is provided in a lower portion of the opening; and
a translucent member that is provided in a bottom surface of the storage portion.

2. The illumination structure according to claim 1, wherein the translucent member is provided in the bottom surface of the storage portion that is disposed above the illumination device when the door is closed.

3. The illumination structure according to claim 2, wherein the bottom surface of the storage portion is formed by a double structure that includes an outer bottom and an inner bottom, the translucent member includes a first translucent member that is provided in the outer bottom and a second translucent member that is provided in the inner bottom, and the second translucent member provided in the inner bottom is higher than the first translucent member provided in the outer bottom in a mechanical strength.

4. The illumination structure according to claim 2, wherein the translucent member is formed so as to be able to diffuse incident light into the storage portion.

5. The illumination structure according to claim 2, wherein a gap is formed between an upper surface of the illumination device and the bottom surface of the storage portion so that the light can also be supplied into a vehicle interior from the gap.

6. The illumination structure according to claim 2, wherein the illumination device is fixed to a step garnish provided in a lower end portion of the opening, and another gap is formed between an inner edge portion of the step garnish and the lower end portion of the opening, so that the light can also be supplied into the vehicle interior from the gap.

* * * * *